(12) United States Patent
Paczkowski et al.

(10) Patent No.: US 11,005,757 B1
(45) Date of Patent: May 11, 2021

(54) NETWORK INTERFACE CONTROLLER (NIC) WITH TRUSTED EXECUTION ENVIRONMENT (TEE) THAT REDIRECTS PACKETS BASED ON A PROCESSING POLICY

(71) Applicant: T-MOBILE INNOVATIONS LLC, Overland Park, KS (US)

(72) Inventors: Lyle W. Paczkowski, Mission Hills, KS (US); William M. Parsel, Overland Park, KS (US); Carl J. Persson, Olathe, KS (US); Matthew C. Schlesener, Shawnee Mission, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/665,925

(22) Filed: Oct. 28, 2019

(51) Int. Cl.
| | |
|---|---|
| *H04L 12/721* | (2013.01) |
| *H04L 12/861* | (2013.01) |
| *H04L 12/26* | (2006.01) |
| *H04L 29/08* | (2006.01) |
| *G06F 21/60* | (2013.01) |
| *H04L 12/46* | (2006.01) |
| *H04L 29/06* | (2006.01) |
| *H04L 12/947* | (2013.01) |

(52) U.S. Cl.
CPC ............ *H04L 45/70* (2013.01); *G06F 21/606* (2013.01); *H04L 12/4633* (2013.01); *H04L 43/028* (2013.01); *H04L 49/9068* (2013.01); *H04L 69/324* (2013.01); *G06F 2221/2149* (2013.01); *H04L 49/252* (2013.01); *H04L 63/029* (2013.01); *H04L 2212/00* (2013.01)

(58) Field of Classification Search
CPC ... H04L 45/70; H04L 49/9068; H04L 43/028; H04L 69/324; H04L 49/252; H04L 63/029; H04L 63/08; H04L 63/105; H04L 67/141; H04L 12/4633; H04L 12/4641; H04L 12/4679; H04L 12/66; H04L 63/0236; H04L 63/162; H04L 63/164; G06F 2221/2149; G06F 21/606
See application file for complete search history.

(56) References Cited

U.S. PATENT DOCUMENTS

| | | | |
|---|---|---|---|
| 9,282,898 B2 | 3/2016 | McRoberts et al. | |
| 2017/0005989 A1* | 1/2017 | Jia | ........................ H04L 63/0281 |
| 2017/0177396 A1* | 6/2017 | Palermo | .................. H04L 49/70 |
| 2017/0177873 A1* | 6/2017 | Raghuram | ............ G06F 21/575 |
| 2017/0250892 A1* | 8/2017 | Cooper | .................. G06F 21/552 |
| 2019/0045037 A1* | 2/2019 | Sukhomlinov | ......... H04L 67/40 |
| 2019/0319848 A1* | 10/2019 | Johnsen | .................. H04L 49/25 |
| 2020/0366493 A1* | 11/2020 | Sood | ........................ H04L 63/20 |

* cited by examiner

*Primary Examiner* — Mewale A Ambaye

(57) ABSTRACT

A network interface controller (NIC). The NIC includes a first physical port, a second physical port, a non-transitory memory, a processor coupled to the first and second physical ports, and a data packet grooming application stored in the non-transitory memory. When executed by the processor, the application is configured to parse datagrams encapsulated within data link layer packets received by the first physical port, analyze the encapsulated datagrams based on a processing policy stored in the non-transitory memory, transmit some of the received data link layer packets via the second physical port to a server computer associated with the NIC, and transmit the remainder of the received data link layer packets via the first physical port to a second server computer.

18 Claims, 6 Drawing Sheets

NETWORK INTERFACE CONTROLLER (NIC) WITH TRUSTED EXECUTION ENVIRONMENT (TEE) THAT REDIRECTS PACKETS BASED ON A PROCESSING POLICY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computers may be communicatively coupled to a data network by a network interface controller (NIC). The NIC acts as a mediator between the data network and the computer, performing what may be deemed low-order processing of data in-bound to the computer and out-bound from the computer. The NIC may be said to be a helper to the computer—a helper to the main processor of the computer—by performing functions that otherwise might burden the computer processing and distract it from heavier weight processing activities. The NIC traditionally interacts with data communication at the physical layer and at the data link layer (e.g., the two lowest layers of the OSI communication model). The NIC may be implemented as a circuit board and may be referred to as a network interface card in some contexts.

SUMMARY

In an embodiment, a method of providing data link layer packets to a server from a network interface controller (NIC) that redirects some of the packets away from the server based on inspection of contents of the packets and based on a processing policy dynamically configured into the NIC in a virtual network function (VNF) computing environment is disclosed. The method comprises receiving a first processing policy by a network interface controller (NIC) that is communicatively coupled to a server computer at a data link layer, configuring a data packet grooming application by a processor of the NIC based on the first processing policy, receiving a first plurality of data link layer packets by the NIC, and storing the first plurality of data link layer packets in a memory of the NIC. The method further comprises parsing a first plurality of datagrams encapsulated within the stored first plurality of data link layer packets by the grooming application, based on parsing the first plurality of datagrams, analyzing the first plurality of encapsulated datagrams based on the first processing policy, transmitting some of the first plurality of data link layer packets on to the server computer, and transmitting the remainder of the first plurality of data link layer packets to a second server computer. The method further comprises receiving a second processing policy by the NIC, configuring the grooming application by the processor based on the second processing policy, receiving a second plurality of data link layer packets by the NIC, and storing the second plurality of data link layer packets in the memory of the NIC. The method further comprises parsing a second plurality of datagrams encapsulated within the stored second plurality of data link layer packets by the grooming application, based on parsing the second plurality of datagrams, analyzing the second plurality of encapsulated datagrams based on the second processing policy, transmitting some of the second plurality of data link layer packets on to the server computer, and transmitting the remainder of the second plurality of data link layer packets to a third server computer.

In another embodiment, a network interface controller (NIC) having a trusted execution environment (TEE) that supports a trusted grooming application that executes in a trusted security zone (TSZ) of the TEE of the NIC is disclosed. The NIC comprises a first physical port configured for being connected to a data transmission line, a second physical port configured for being connected to a server computer associated with the NIC, a processor coupled to the first and second physical ports, where the processor comprises a trusted security zone (TSZ) portion that supports a trusted execution environment (TEE) of the NIC, a non-transitory memory having a trusted portion and a normal portion, wherein the trusted portion of the non-transitory memory supports the TEE of the NIC, and a transitory memory having a trusted portion and a normal portion, wherein the trusted portion of the transitory memory supports the TEE of the NIC. The NIC further comprises a data packet grooming application stored in the normal portion of the non-transitory memory and a trusted data packet grooming application stored in the trusted portion of the non-transitory memory. When executed by the processor, the data packet grooming application parses datagrams encapsulated in data link layer packets received by the first physical port, identifies datagrams that are associated with normal application layer communications, causes the data link layer packets comprising datagrams associated with normal application layer communications to be transmitted by the second physical port to the server computer, identifies datagrams that are associated with trusted application layer communications, and invokes the trusted grooming application to handle the data link layer packets containing datagrams associated with trusted application layer communications. When executed by the TSZ portion of the processor, the trusted data packet grooming application determines a service group associated with the data link layer packets containing datagrams associated with trusted application layer communications, processes the data link layer packets associated with each service group with a service group specific routine of the grooming trusted application, and causes the processed data link layer packets to be transmitted by the second physical port to the server computer.

In yet another embodiment, a network interface controller (NIC) that executes an application that processes data packets in-bound to a server computer associated with the NIC and transmits processed data packets to the server computer is disclosed. The NIC comprises a first physical port configured for being connected to a data transmission line, a second physical port configured for being connected to a server computer associated with the NIC, a non-transitory memory, a processor coupled to the first and second physical ports, and a data packet grooming application stored in the non-transitory memory. When executed by the processor, the data packet grooming application parses datagrams encapsulated within data link layer packets received by the first physical port, analyzes the encapsulated datagrams based on a processing policy stored in the non-transitory memory, transmits some of the received data link layer packets via the second physical port to the server computer, and transmits the remainder of the received data link layer packets via the first physical port to a second server computer.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
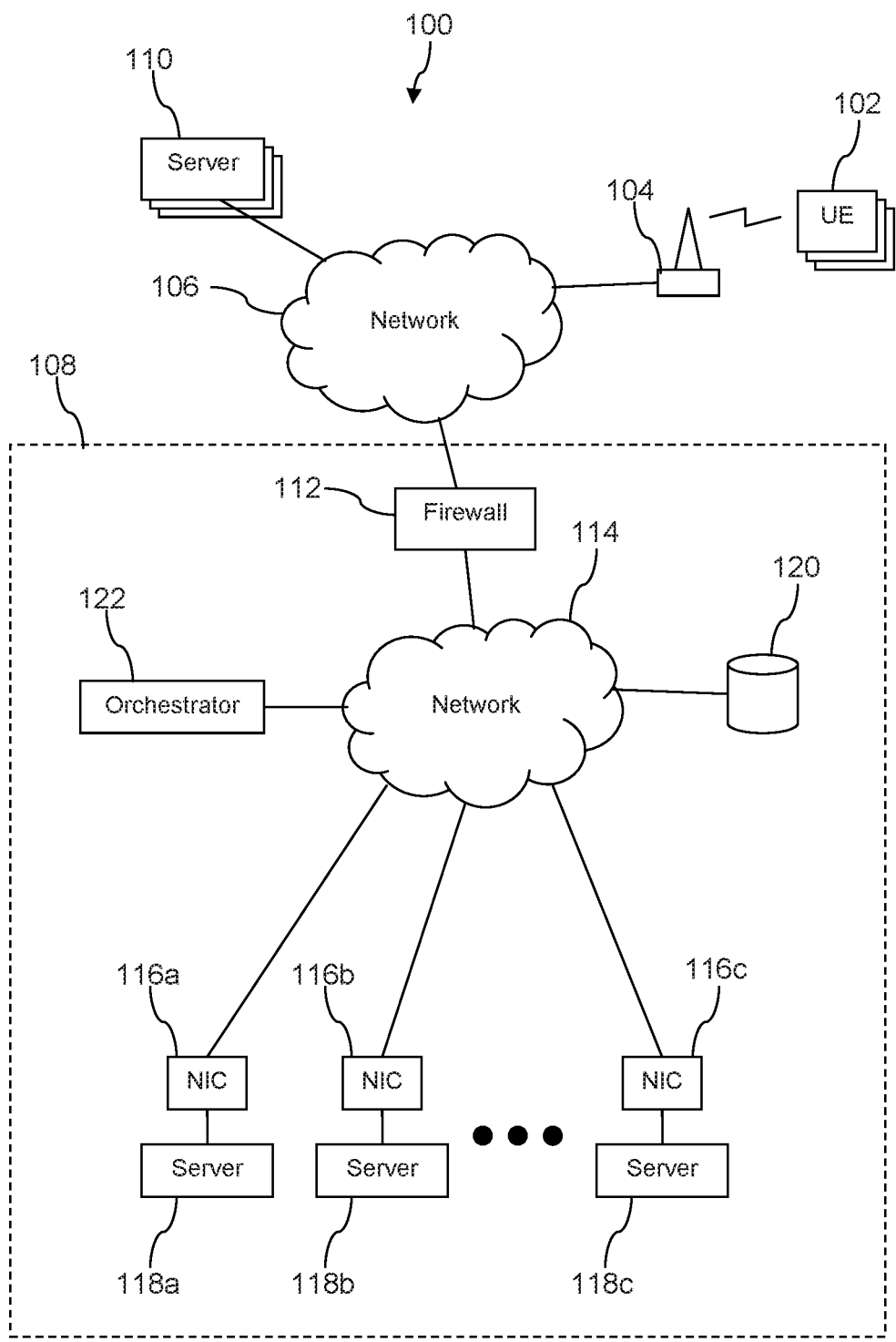
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a network interface controller (NIC) that parses datagrams from data link layer packets received from a data network and analyzes the datagrams. In an embodiment, the packets are parsed deeply to analyze an application layer datagram encapsulated in the data link layer packets and to process the data link layer packets based on the content of the application layer datagrams and based on a processing policy configured into the NIC. After this processing, the NIC sends at least some of the data link layer packets on to a server computer associated with the NIC. The NIC may be a system on a chip (SoC) that is installed on a server circuit board or a server blade in a server rack. Alternatively, the NIC may be a circuit card that stands between the data network and the server computer.

The NIC taught herein has greater processing capacity and more memory than traditional NICs, whereby to support the greater amount of processing allocated to this NIC. In some contexts, the NIC taught herein may be referred to as a "beefed up" NIC. The NIC taught herein is configured to be dynamically configured with a processing policy, thereby promoting rapidly repurposing the NIC for performing different processing activities. It is expected that this ability to perform new kinds of processing and to dynamically reconfigure this processing may be advantageous in a network function virtualization (NFV) operation model currently being adopted by major wireless communication carriers. By contrast, traditional NICs have modest processing capacity and memory and are statically configured to perform rudimentary layer 1/layer 2 communications functions.

In an example, the NIC is configured with a processing policy that performs data deflection or another kind of processing of datagrams. Based on analyzing the application layer datagrams encapsulated in data link layer packets received from a data network the NIC is connected to, the NIC may transmit some of the received data link layer packets on to the server computer to which the NIC is associated and may transmit the remainder of the received data link layer packets back to the data network, addressed to a different server computer. By changing the processing policy, for example by an orchestrator in an NFV operation environment dynamically reconfiguring the NIC with a new processing policy, the NIC can apply different data deflection rules or process the datagrams in different ways that may not strictly speaking be considered data deflection. The different processing policy may define how data link layer packets that are not to be transmitted to the server associated with the NIC are handled. A first processing policy may command that the remaining data link layer packets not transmitted to the server associated with the NIC be dropped. A second processing policy may command that the remaining data link layer packets be stored in a central datastore. A third processing policy may command that the remaining data link layer packets be dropped by the NIC, that the NIC create an application layer message indicating the data link layer packets have been dropped, that the NIC encapsulate the application layer message in a data link layer packet (and possibly a network layer packet and a transport layer packet inside the network layer packet containing the application layer message), and transmit the data link layer packet back to a sender. A fourth processing policy may command that the remaining data link layer packets be transmitted by the NIC to a different server than the server the NIC is associated with.

It is thought that the expanded role provided for the NIC of the present disclosure, which may be said to provide an architectural paradigm shift, will provide desirable capabilities for the coming 5G wireless communication network. The processing burden on computer systems in the current architectural paradigm for inspecting communication packets that ultimately it will not fully process is significant. For example, some of that burden on the computer system may be identifying and responding to problems in the datagrams, such as incomplete messages or mangled messages. By delegating the initial inspection of application layer datagrams to the enhanced NIC of the present disclosure, much wasted processing by the computer system can be avoided, thereby effectively increasing the efficiency of the computer system. If the NIC determines that the subject datagram is not to be passed on to the computer system it is associated with, it dispositions the datagram (discards, stores, or forwards) without itself processing the datagram any further than to apply the processing policy it is configured with. Additionally, some security advantages can be achieved by deflecting datagrams before they ever reach the computer system itself. This may prevent any malicious datagrams from interfering with or corrupting applications executing on the computer system itself. For example, in an embodiment, the NIC may be relatively stateless (e.g., it processes a message and either passes it along or does not pass it along and does not process subsequent datagrams in the context of previous datagrams) and hence is less vulnerable to attempts to hack into confidential information of the computer system because it simply does not have that information stored.

In an embodiment, the NIC provides a trusted execution environment (TEE) for performing trusted communication functions. The NIC may comprise a processor that has a trusted security zone (TSZ) and may comprise a memory that has a trusted portion only accessible by the TSZ of the processor. The processor TSZ and the trusted portion of memory may be said to constitute the TEE of the NIC. When the NIC determines that an application layer message encapsulated in the data link layer packets is intended to be handled with trust, the NIC may switch to executing in its TEE to handle the data link layer packets. It is noted that the NIC may be able to determine that data link layer packets are to be handled with trust by parsing the transport layer datagram without deeper parsing of the data link layer packets or even by parsing the network layer datagram without deeper parsing of the data link packets. The deep packet inspection and application of policy may be performed by the NIC while executing in the TSZ. This may help make the processing policy more secure and less liable to be discovered by hackers. In an embodiment, the processing policy may be stored in the trusted portion of memory of the NIC. Trusted security zones (TSZs) and trusted execution environments (TEEs) are discussed further below.

Having the enhanced NIC of the present disclosure apply the processing policy rather than have a separate firewall server of offsite computer system apply the processing policy may provide several advantages. As pointed out above, the enhanced NIC is likely architecturally less susceptible to hacking, because of its statelessness, unlike either a firewall server or another (offsite) computer system. Additionally, adding extra computer systems to apply the processing policy—such as a separate firewall server or an offsite computer system—cannot be said to save any computing burden: the same burden is simply redistributed to a different computer system. The enhanced NIC of the present disclosure, in a sense, is able to apply the processing policy in a very lightweight manner of processing (little additional processing is called for) because it is already in stream with the data. Having the enhanced NIC associated with the computer system apply the processing policy may better support fine grained deployment of processing policies: every different computer system may have its NIC configured with its own possibly unique processing policies.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. Pat. No. 9,282,898, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a communication system 100 is described. In an embodiment, the system 100 comprises a plurality of user equipments (UEs) 102, a cell site 104, a network 106, a network domain 108, and a plurality of server computers 110. The network domain 108 may be considered to be a portion of the network 106 but is illustrated separately in FIG. 1 so as to promote describing details relevant to the present disclosure. The cell site 104 may provide wireless communication links to the UEs 102 whereby to provide communication coupling of the UEs 102 to the network 106. The cell site 104 may provide wireless communication links according to one or more of a 5G, a long term evolution (LTE), a code division multiple access (CDMA), or a global system for mobile communication (GSM) wireless communication protocol. The UEs 102 and/or the server computers 110 may send and receive data communication messages from the network domain 108 via the network 106. The network 106 comprises one or more public networks, one or more private networks, or a combination thereof. While a single cell site 104 is illustrated in FIG. 1, it is understood that the system 100 may comprise any number of cell sites 104. Likewise, while a single network domain 108 is illustrated in FIG. 1, it is understood that the system 100 may comprise any number of network domains 108.

In an embodiment, the network domain 108 comprises a firewall 112, a data network 114, a plurality of network interface controllers (NICs) 116, a plurality of server computers 118, a data store 120, and an orchestrator 122, where each NIC 116 is associated with one server computer 118. In an embodiment, the network domain 108 comprises a first NIC 116a associated with a first server computer 118a, a second NIC 116b associated with a second server computer 118b, and a third NIC 116c associated with a third server computer 118c. It is understood that the network domain 108 may comprise any number of NICs 116 and any number of server computers 118.

The firewall 112 may restrict data message traffic from the network 106 into the data network 114. The firewall 112 may restrict in-bound data message traffic based on a source address of the messages, for example blocking messages in-bound from blacklisted source addresses and/or allowing messages in-bound from whitelisted source addresses. The firewall 112 may restrict in-bound data message traffic based on security rules configured into the firewall 112. Generally, the firewall 112 applies the same security rules to all in-bound data message traffic, hence the firewall 112 may be said to apply a uniform security policy across the whole of the network domain 108. In some contexts, the network 106 may be referred to as an external network, and the data network 114 may be referred to as an internal network, a core network, or an enterprise network. The firewall 112 can be said to act as a barrier between the external network and the internal network, whereby to protect the internal network from cyber threats that are in the wild on the external network.

Data messages in the data network 114 may each comprise a plurality of encapsulated datagrams. An application layer message may be encapsulated within a data field of a transport layer datagram. The transport layer datagram may be encapsulated within a data field of a network layer datagram. The network layer datagram may be encapsulated within a data field of a data link layer datagram. When a data link layer datagram is received by a NIC 116, the NIC 116 may parse the data link layer datagram whereby to analyze the content of the datagram at different communication layers.

The NIC 116 may pass the data link layer datagram unchanged to the server computer 118 that it is associated with. The NIC 116 may transform some portion of the data link layer datagram in some way and pass the modified data link layer datagram on to the server computer 118 it is associated with. The NIC 116 may not pass the data link layer datagram on to the server computer 118 it is associated with but instead may retransmit it back to the data network 114, for example to the data store 120 for archiving, to another server computer 118 not associated with the NIC 116 (e.g., the first NIC 116a may retransmit the data link layer datagram to the second server computer 118b associated with the second NIC 116b), or to a server computer 110 or a UE 102 via the network 106. When the server computer 118 transmits a message to the NIC 116 associated with that server, the NIC 116 may pass the message encapsulated in a data link layer datagram to the data network 114, and the data network 114 may transmit the data link layer datagram through the firewall 112 to the network 106 and from there on to a UE 102 or a server computer 110.

Figure 2:
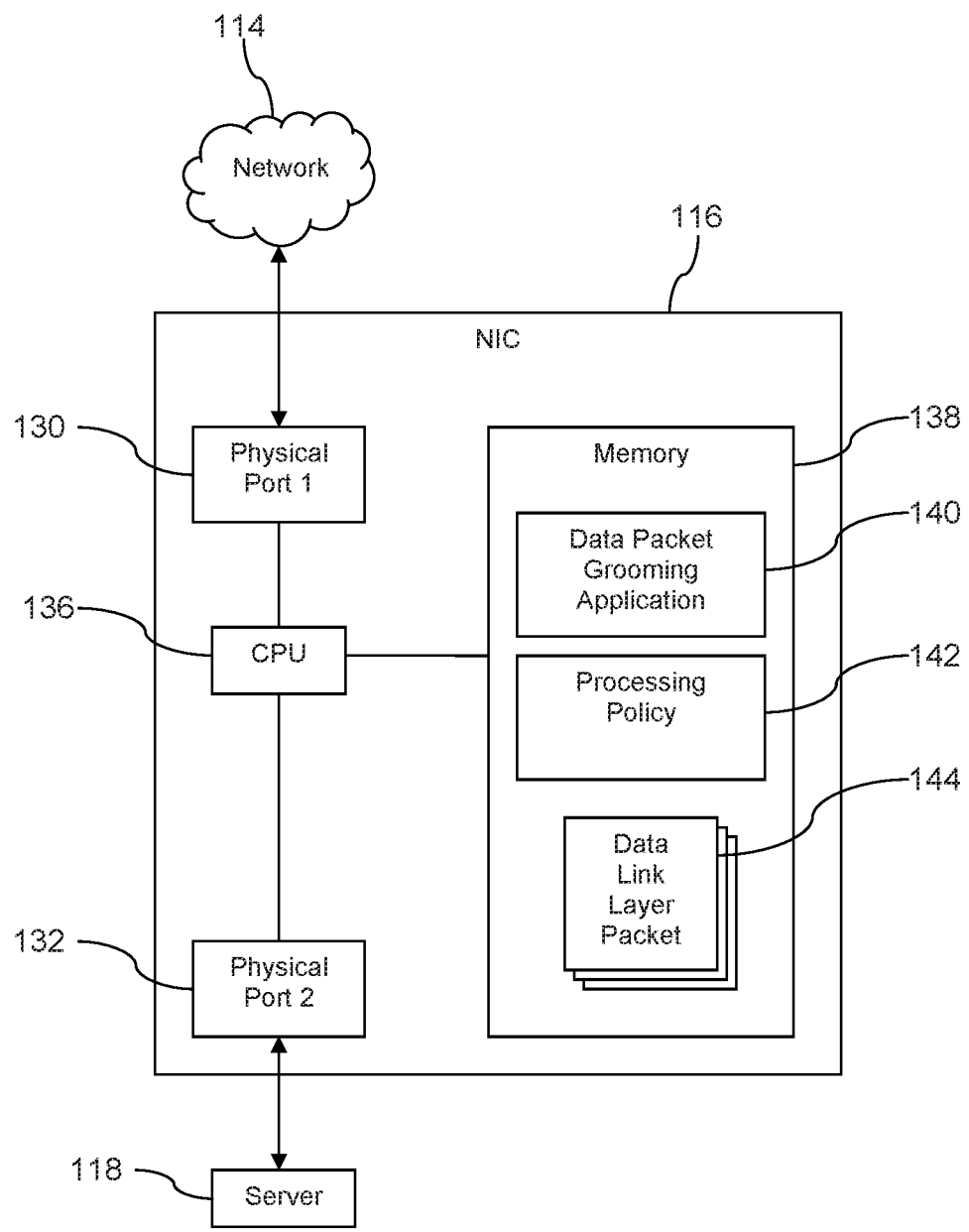
FIG. 2 is a block diagram of a network interface controller (NIC) according to an embodiment of the disclosure.

Turning now to FIG. 2, details of a NIC 116 are described. In an embodiment, the NIC 116 comprises a first physical port 130, a second physical port 132, a processor 136, and a memory 138. The memory 138 comprises a data packet grooming application 140, a processing policy 142, and optionally one or more data link layer packets 144. The data packet grooming application 140 and the processing policy 142 may be stored in a non-transitory memory portion of the memory 138. In some contexts, the processing policy 142 may be referred to as a datagram processing policy or a data link layer packet processing policy. In some contexts, the data packet grooming application 140 may be referred to as a data packet processing application. The data link layer packets 144 may be stored in a non-transitory memory portion of the memory 138 or in a transitory memory portion of the memory 138. The first physical port 130 is connected to the data network 114. The second physical port 132 is connected to the server computer 118. The NIC 116 may be said to be associated with the server computer 118 that it is connected to via the second physical port 132.

The first physical port 130 provides a connection to the data network 114 that satisfies the physical specifications of a data link layer protocol supported by the data network 114. In an embodiment, the first physical port 130 communicates with the data network 114 according to an Ethernet data link layer protocol. Alternatively, in an embodiment, the first physical port 130 communicates with the data network 114 according to an optical data link layer protocol, for example a fiber distributed data interface (FDDI) data link layer protocol or other optical data link layer protocol. Alternatively, in an embodiment, the first physical port 130 communications with the data network 114 according to a high-level data link control (HDLC) protocol, a point-to-point (PPP) protocol, an asynchronous transfer mode (ATM) protocol or other data link layer protocol. The first physical port 130 complies with the specifications of the data link layer protocol supported by the data network 114 with reference to voltage levels, bit rates, and signaling conventions.

The processor 136 may store incoming data link layer packets in the memory 138, for example the data link layer packets 144. In some contexts the processor 136 may be said to queue the received data link layer packets 144 for processing by the data packet grooming application 140. The processor 136 executes the data packet grooming application 140 which process the data link layer packets 144 based on the processing policy 142. In an embodiment, the processing policy 142 may be stored in memory 138 separately from the data packet grooming application 140. In another embodiment, the processing policy 142 may be stored within the data packet grooming application 140 and hence be considered to be part of the data packet grooming application 140.

In an embodiment, the NIC 116 is able to reconfigure the processing policy 142, for example by receiving a command from the data network 114. In an embodiment, the orchestrator 122 can send a command to the NIC 116 to update the processing policy 142. The orchestrator 122 may send a new processing policy to the NIC 116 that replaces the processing policy 142. Alternatively, the NIC 116 may read the new processing policy from the data store 120 upon command of the orchestrator 122. In another embodiment, the server computer 118 associated with the NIC 116 can send a command to the NIC 116 to update the processing policy 142. The NIC 116 may read the new processing policy from the data store 120 upon command from the server computer 118.

The data packet grooming application 140 parses and analyzes data link layer packets 144 and then takes some action based on the content of the data link layer packets 144 and based on the processing policy 142. In an example, the data packet grooming application 140 drops some data link layer packets 144 (e.g., erases them from the memory 138 or frees the space occupied by these packets and makes it available for overwriting) and transmits other data link layer packets 144 unaltered via the second physical port 132 to the server computer 118. In another example, the data packet grooming application 140 may determine that some data link layer packets 144 are associated with a higher priority than other data link layer packets 144 and transmit the higher priority data link layer packets 144 via the second physical port 132 to the server computers 118 first. The identification of priorities of data link layer packets 144 may entail parsing application layer datagrams encapsulated within the data link layer packets 144 and assembling a plurality of related application layer datagrams to determine a quality of service (QoS) associated with the application layer datagrams and delivering the data link layer packets 144 with a high priority application in priority order.

In another example, the data packet grooming application 140 may identify data link layer packets 144 associated with the same application layer session and align the data link layer packets 144 associated with the same application layer session in order (e.g., according to a transport control protocol (TCP) header sequence number), whereby to promote the server computers 118 processing more rapidly. In another example, the data packet grooming application 140 may identify errored data link layer packets 144 (e.g., a data link layer packet that has a TCP header checksum that does not agree with the data of the TCP datagram) and reply to the source of the data link layer packet 144 to resend, whereby to reduce the processing burden on the server computers 118. In some context, the processing provided by the data packet grooming application 140 may be referred to as grooming or pre-processing the incoming data link layer packets 144. In some cases, the processing provided by the data packet grooming application 140 may provide a wide variety of processing.

When the server computer 118 sends outgoing data messages to the second physical port 132, the processor 136 may create data link layer packets encapsulating the outgoing data messages and transmit them via the first physical port 130 to the data network 114. In some contexts, this may be referred to as the NIC 116 passing through the communications from the server computer 118. The NIC 116 may queue and manage the outgoing data messages it receives from the server computer 118 to coordinate its transmissions with the data network 114. For example, the data network 114 may be busy when the NIC 116 is ready to transmit outgoing messages but it queues these messages until there is bandwidth on the data network 114 that allows the first physical port 130 of the NIC 116 to transmit.

Figure 3:
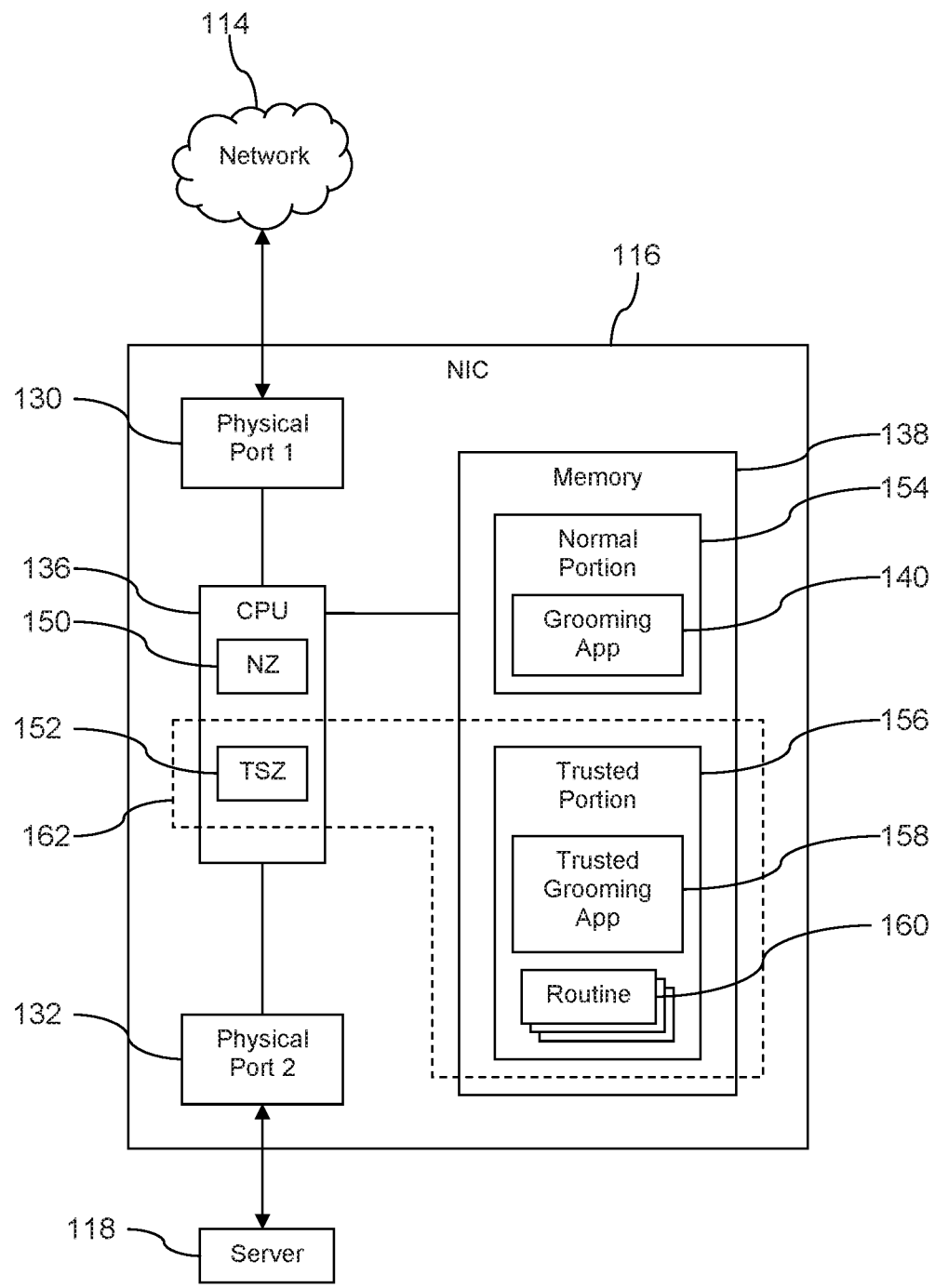
FIG. 3 is a block diagram of another network interface controller (NIC) according to an embodiment of the disclosure.

Turning now to FIG. 3, further details of the NIC 116 are described. In an embodiment, the NIC 116 provides a trusted execution environment (TEE) 162 that promotes handling some data link layer packets 144 in accordance with trusted communication practices. In an embodiment, the processor 136 comprises a normal zone 150 and a trusted security zone (TSZ) 152. In an embodiment, the memory 138 comprises a normal memory portion 154 that stores the data packet grooming application 140 and a trusted memory portion that stores a trusted grooming application 158 and one or more routines 160. In some contexts, each of the routines 160 may be referred to as a service group specific routine. The TSZ 152 and the trusted portion of memory 156 may be deemed to constitute the TEE 162.

When the data packet grooming application 140 parses a data link layer packet 144 and analyzes embedded datagrams it may determine that the embedded datagrams are associated with a trusted communication message (e.g., a message that has been designated for being handled with trust in a trusted security zone). The trusted nature of a datagram may be indicated in a header of the datagram, for example in a protocol number of protocol port number associated with the datagram. The data packet grooming application 140 may invoke the trusted grooming application 158 to further process datagrams designated for handling in trust. The invocation of the trusted grooming application 158 entails the TSZ 152 portion of the processor 136 executing, and when the TSZ 152 portion of the processor 136 executes, the normal zone 150 portion of the processor 150 is not enabled to access the physical ports 130, 132 or the memory 138. The TSZ 152 executes the trusted grooming application 158 that performs processing on the data link layer packets 144 designated for trusted handling. The trusted grooming application 158 may determine that the data link layer packet 144 is associated with a specific service group, for example a specific group of network function virtualizations (NFVs) and invoke a routine 160 associated with that specific group to pre-process the data link layer packet 144. Part of the processing provided by the trusted grooming application 158 and/or the routine 160 may entail transmitting the data link layer packet 144 that is designated for trusted handling via the second physical port 132 to the server computer 118.

Figure 4A:
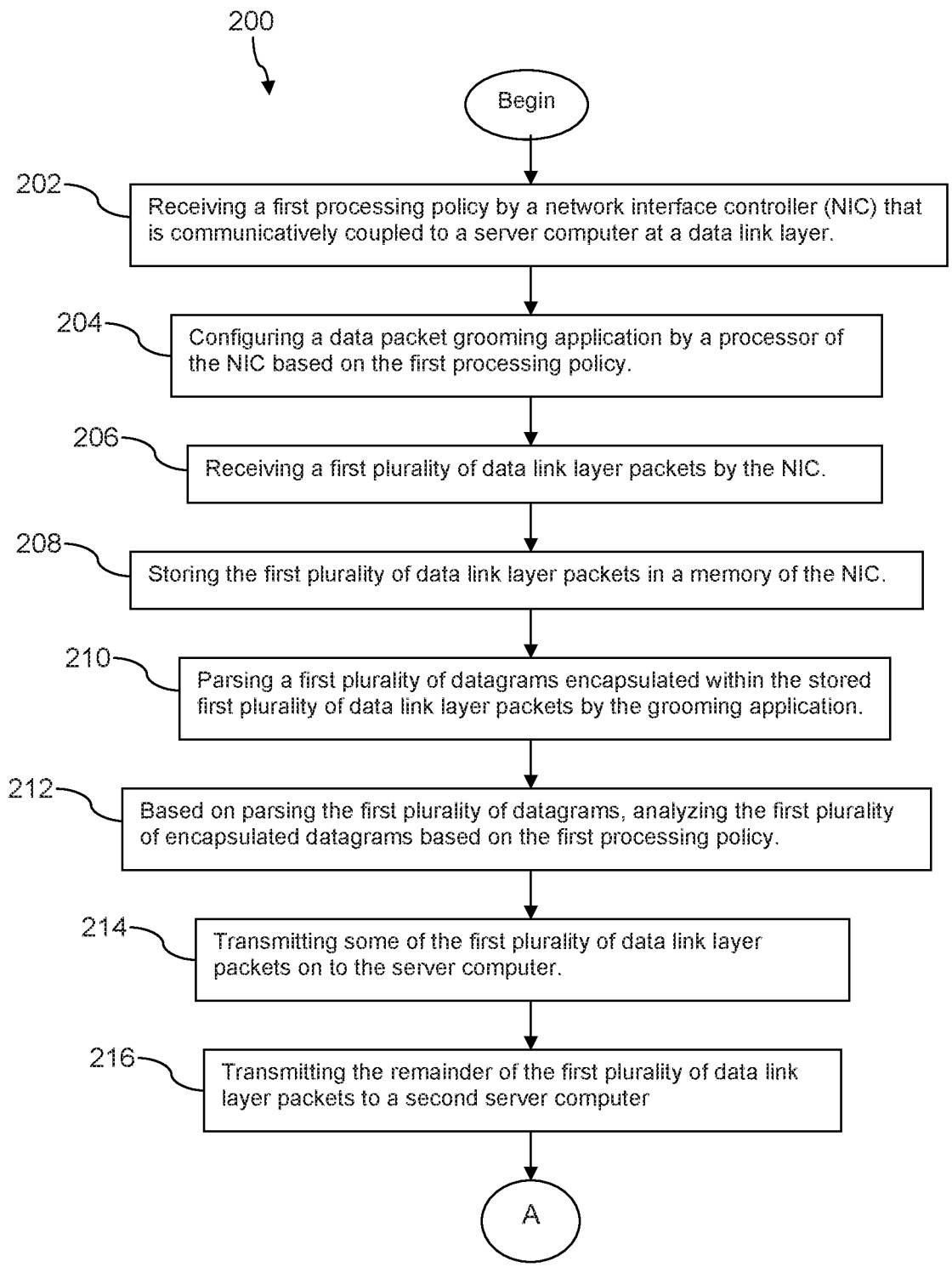
FIG. 4A and FIG. 4B are a flow chart of a method according to an embodiment of the disclosure.
Figure 4B:
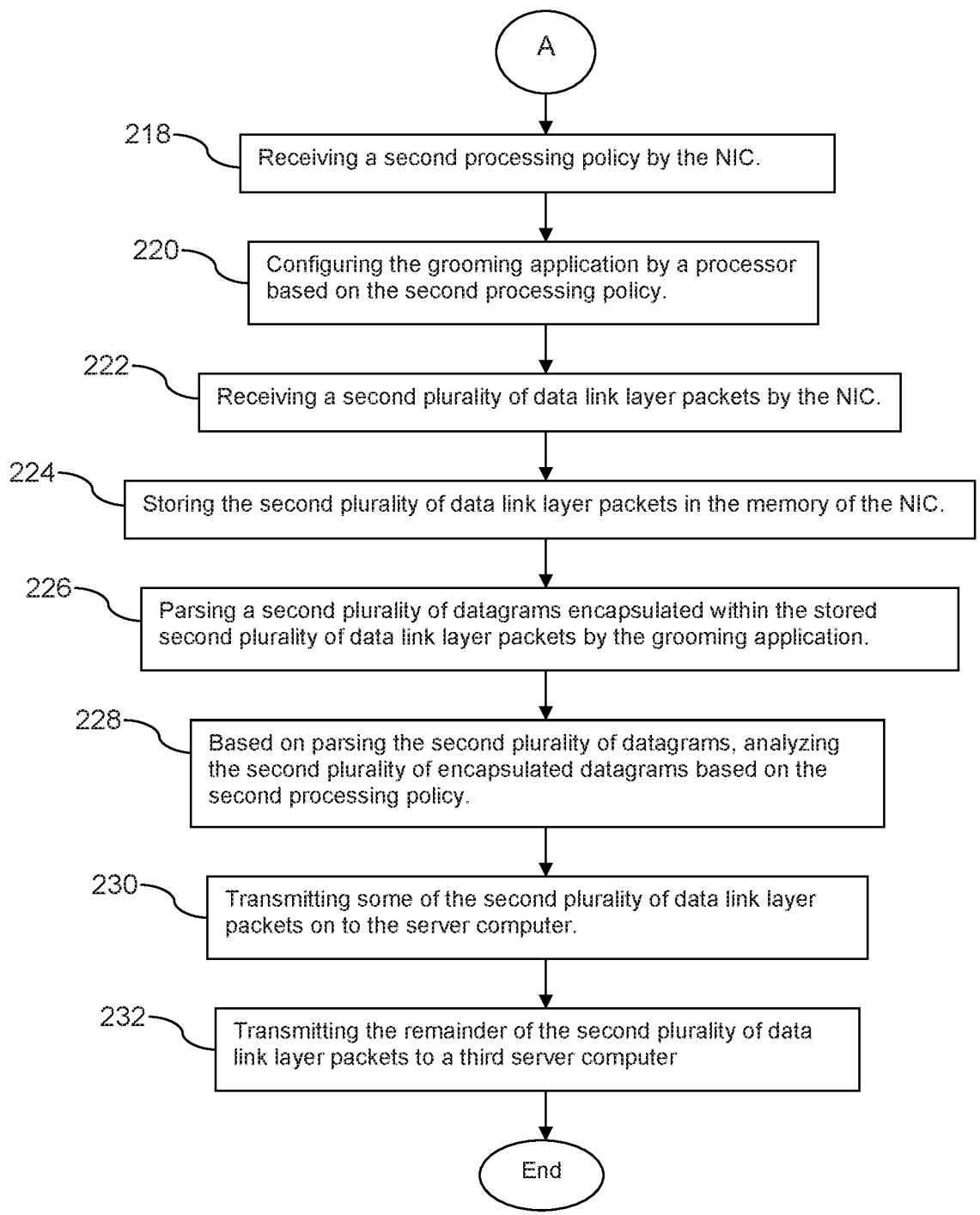

Turning now to FIG. 4A and FIG. 4B, a method 200 is described. In an embodiment, the method 200 is a method of providing data link layer packets to a server from a network interface controller (NIC) that redirects some of the packets away from the server based on inspection of contents of the packets and based on a processing policy dynamically configured into the NIC in a virtual network function (VNF) computing environment. At block 202, the method 200 comprises receiving a first processing policy by a network interface controller (NIC) that is communicatively coupled to a server computer at a data link layer.

At block 204, the method 200 comprises configuring a data packet grooming application by a processor of the NIC based on the first processing policy. At block 206, the method 200 comprises receiving a first plurality of data link layer packets by the NIC.

At block 208, the method 200 comprises storing the first plurality of data link layer packets in a memory of the NIC. At block 210, the method 200 comprises parsing a first plurality of datagrams encapsulated within the stored first plurality of data link layer packets by the grooming application.

At block 212, the method 200 comprises, based on parsing the first plurality of datagrams, analyzing the first plurality of encapsulated datagrams based on the first processing policy. At block 214, the method 200 comprises transmitting some of the first plurality of data link layer packets on to the server computer. At block 216, the method 200 comprises transmitting the remainder of the first plurality of data link layer packets to a second server computer.

At block 218, the method 200 comprises receiving a second processing policy by the NIC. At block 220, the method 200 comprises configuring the grooming application by a processor based on the second processing policy.

At block 222, the method 200 comprises receiving a second plurality of data link layer packets by the NIC. At block 224, the method 200 comprises storing the second plurality of data link layer packets in the memory of the NIC.

At block 226, the method 200 comprises parsing a second plurality of datagrams encapsulated within the stored second plurality of data link layer packets by the grooming application. At block 228, the method 200 comprises, based on parsing the second plurality of datagrams, analyzing the second plurality of encapsulated datagrams based on the second processing policy.

At block 230, the method 200 comprises transmitting some of the second plurality of data link layer packets on to the server computer. At block 232, the method 200 comprises transmitting the remainder of the second plurality of data link layer packets to a third server computer.

In an embodiment, the method 200 may further comprise receiving a data link layer packet processing policy by the NIC and configuring the grooming application by the processor based on the data link layer packet processing policy. The method 200 may further comprise receiving a third plurality of data link layer packets by the NIC, storing the third plurality of data link layer packets in the memory of the NIC, and parsing a third plurality of datagrams encapsulated within the stored third plurality of data link layer packets by the grooming application. The method 200 may further comprise, based on parsing the third plurality of datagrams, analyzing the third plurality of encapsulated datagrams based on the data link layer packet processing policy, and, based on analyzing the third plurality of encapsulated datagrams, processing the third plurality of data link layer packets based on the data link layer packet processing policy.

Figure 5:
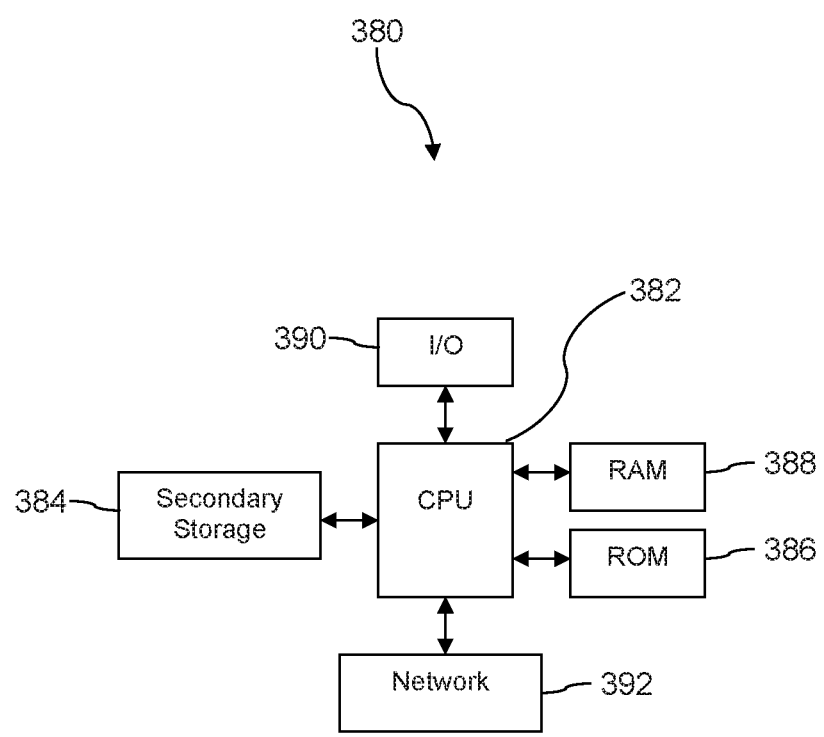
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the VO devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), or radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing data link layer packets to a server from a network interface controller (NIC) that redirects some of the packets away from the server based on inspection of contents of the packets and based on a processing policy dynamically configured into the NIC in a virtual network function (VNF) computing environment, comprising:

receiving a first processing policy by a network interface controller (NIC) that is communicatively coupled to a server computer at a data link layer;

configuring a data packet grooming application by a processor of the NIC based on the first processing policy;

receiving a first plurality of data link layer packets by the NIC;

storing the first plurality of data link layer packets in a memory of the NIC;

parsing a first plurality of datagrams encapsulated within the stored first plurality of data link layer packets by the grooming application;

based on parsing the first plurality of datagrams, analyzing the first plurality of encapsulated datagrams based on the first processing policy;

transmitting some of the first plurality of data link layer packets on to the server computer;

transmitting the remainder of the first plurality of data link layer packets to a second server computer;

receiving a second processing policy by the NIC;

configuring the grooming application by the processor based on the second processing policy;

receiving a second plurality of data link layer packets by the NIC;

storing the second plurality of data link layer packets in the memory of the NIC;

parsing a second plurality of datagrams encapsulated within the stored second plurality of data link layer packets by the grooming application;

based on parsing the second plurality of datagrams, analyzing the second plurality of encapsulated datagrams based on the second processing policy;

transmitting some of the second plurality of data link layer packets on to the server computer; and transmitting the remainder of the second plurality of data link layer packets to a third server computer.

2. The method of claim 1, wherein parsing the first plurality of data link layer packets and the second plurality of data link layer packets comprises extracting network layer datagrams encapsulated in the data link layer packets.

3. The method of claim 2, wherein parsing the first plurality of data link layer packets and the second plurality of data link layer packets comprises extracting transport layer datagrams encapsulated in the network layer datagrams.

4. The method of claim 3, wherein parsing the first plurality of data link layer packets and the second plurality of data link layer packets comprises extracting application layer datagrams encapsulated in the transport layer datagrams.

5. The method of claim 1, wherein the NIC comprises a first physical port and a second physical port, wherein the NIC receives the first and second processing policies and the first and second plurality of data link layer packets from a data network via the first physical port, and wherein the NIC is coupled to the server computer via the second physical port.

6. The method of claim 1, further comprising:
receiving a data link layer packet processing policy by the NIC;
configuring the grooming application by the processor based on the data link layer packet processing policy;
receiving a third plurality of data link layer packets by the NIC;
storing the third plurality of data link layer packets in the memory of the NIC;
parsing a third plurality of datagrams encapsulated within the stored third plurality of data link layer packets by the grooming application;
based on parsing the third plurality of datagrams, analyzing the third plurality of encapsulated datagrams based on the data link layer packet processing policy; and
based on analyzing the third plurality of encapsulated datagrams, processing the third plurality of data link layer packets based on the data link layer packet processing policy.

7. The method of claim 6, wherein processing the third plurality of data link layer packets based on the data link layer packet processing policy comprises dropping some of the third plurality of data link layer packets and transmitting the remainder of the third plurality of data link layer packets to the server computer.

8. The method of claim 6, wherein processing the third plurality of data link layer packets based on the data link layer packet processing policy comprises separating data link layer packets associated with a higher priority from data link layer packets associated with a lower priority, further comprising transmitting the higher priority data link layer packets to the server computer first and transmitting the lower priority data link layer packets to the server computer after transmitting the higher priority data link layer packets.

9. The method of claim 6, wherein processing the third plurality of data link layer packets based on the data link layer packet processing policy comprises identifying errored data link layer packets and sending a message to a source of the data link layer packets requesting the data link layer packets be resent.

10. The method of claim 6, wherein processing the third plurality of data link layer packets based on the data link layer packet processing policy comprises:
identifying data link layer packets associated with a first application layer session;
identifying data link layer packets associated with a second application layer session;
transmitting the data link layer packets associated with the first application layer session to the server computer; and
after transmitting the data link layer packets associated with the first application layer session to the server computer, transmitting the data link layer packets associated with the second application layer session.

11. The method of claim 10, further comprising determining a sequence order of the data link layer packets associated with the first application layer and determining a sequence order of the data link layer packets associated with the second application layer, wherein transmitting the data link layer packets associated with the first application layer session to the server computer comprises transmitting the data link layer packets associated with the first application layer session in sequence order to the server computer, and wherein transmitting the data link layer packets associated with the second application layer session to the server computer comprises transmitting the data link layer packets associated with the second application layer session in sequence order to the server computer.

12. The method of claim 6, wherein processing the third plurality of data link layer packets based on the data link layer packet processing policy comprises identifying errors in some of the third plurality of data link layer packets, dropping packets with errors, and transmitting a resend request associated with the packets with errors to the sender of the packets with errors.

13. A network interface controller (NIC) having a trusted execution environment (TEE) that supports a trusted grooming application that executes in a trusted security zone (TSZ) of the TEE of the NIC, comprising:
a first physical port configured for being connected to a data transmission line;
a second physical port configured for being connected to a server computer associated with the NIC;
a processor coupled to the first and second physical ports, where the processor comprises a trusted security zone (TSZ) portion that supports a trusted execution environment (TEE) of the NIC;
a non-transitory memory having a trusted portion and a normal portion, wherein the trusted portion of the non-transitory memory supports the TEE of the NIC;
a transitory memory having a trusted portion and a normal portion, wherein the trusted portion of the transitory memory supports the TEE of the NIC;
a data packet grooming application stored in the normal portion of the non-transitory memory; and
a trusted data packet grooming application stored in the trusted portion of the non-transitory memory,
wherein when executed by the processor, the data packet grooming application
parses datagrams encapsulated in data link layer packets received by the first physical port,
identifies datagrams that are associated with normal application layer communications,
causes the data link layer packets comprising datagrams associated with normal application layer communications to be transmitted by the second physical port to the server computer,
identifies datagrams that are associated with trusted application layer communications, invokes the trusted grooming application to handle the data link layer packets containing datagrams associated with trusted application layer communications, and wherein when executed by the TSZ portion of the processor, the trusted data packet grooming application determines a service group associated with the data link layer packets containing datagrams associated with trusted application layer communications, processes the data link layer packets associated with each service group with a service group specific routine of the grooming trusted application, and causes the processed data link layer packets to be transmitted by the second physical port to the server computer.

14. The NIC of claim 13, wherein the server computer associated with the NIC provides network function virtualization (NFV) in a wireless communication core network.

15. The NIC of claim 14, wherein the service group identifies a group of virtualized network functions.

16. The NIC of claim 13, wherein the data packet grooming application is configured with a processing policy and wherein the data packet grooming application parses the datagrams encapsulated in the data link layer packets received by the first physical port based on the processing policy and further processes the datagrams encapsulated in the data link layer packets based on the processing policy.

17. A network interface controller (NIC) that executes an application that processes data packets in-bound to a server computer associated with the NIC and transmits processed data packets to the server computer, comprising:

a first physical port configured for being connected to a data transmission line, wherein the first physical port is configured to communicate with the data transmission link with one of a high-level data link control (HDLC) protocol, a point-to-point (PPP) protocol, or an asynchronous transfer mode (ATM) protocol;

a second physical port configured for being connected to a server computer associated with the NIC;

a non-transitory memory;

a processor coupled to the first and second physical ports; and a data packet grooming application stored in the non-transitory memory that, when executed by the processor parses datagrams encapsulated within data link layer packets received by the first physical port, analyzes the encapsulated datagrams based on a processing policy stored in the non-transitory memory, transmits some of the received data link layer packets via the second physical port to the server computer, and transmits the remainder of the received data link layer packets via the first physical port to a second server computer.

18. The NIC of claim 17, wherein the processing policy is dynamically configurable.

* * * * *